United States Patent [19]
Gallagher-Daggitt

[11] 3,872,660

[45] Mar. 25, 1975

[54] METHODS OF, AND APPARATUS FOR, THE MANUFACTURE OF STRANDED CABLES

[75] Inventor: George Edward Gallagher-Daggitt, Abingdon, England

[73] Assignee: Science Research Council, London, England

[22] Filed: Nov. 23, 1973

[21] Appl. No.: 418,176

[30] Foreign Application Priority Data
Nov. 24, 1972 United Kingdom............. 54479/72

[52] U.S. Cl..................... 57/58.3, 57/58.36, 57/166
[51] Int. Cl.............................................. D07b 1/22
[58] Field of Search......... 57/9, 13, 15, 58.3, 58.32, 57/58.34, 58.36, 58.38, 166

[56] References Cited
UNITED STATES PATENTS

| | | | |
|---|---|---|---|
| 1,951,513 | 3/1934 | Larmuth | 57/58.3 |
| 2,043,130 | 6/1936 | Traugott | 57/15 X |
| 2,058,234 | 10/1936 | Johannessen | 57/15 |
| 2,530,726 | 11/1950 | Rasmussen | 57/166 X |
| 2,882,676 | 4/1959 | Bryan et al. | 57/166 X |
| 3,641,755 | 2/1972 | Heiner | 57/166 X |

*Primary Examiner*—Donald E. Watkins
*Attorney, Agent, or Firm*—Larson, Taylor & Hinds

[57] ABSTRACT

A method of manufacturing stranded cables having non-circular cross-section comprising drawing the strands through spaced-apart locations constrained to move around a predetermined non-circular path defining a shape corresponding generally to the desired cross-section of the cable, and subsequently passing the strands through first a stranding plate and then a die whilst maintaining a drawing force on the strands.

Each of the locations comprises in effect, an off-centre point location on a disc caused to be driven around and in contact with the inside of a circle so that the point locations move with a substantially constant linear velocity.

Alternatively each of the locations comprises, in effect, a point location on an endless chain caused to move to describe a shape corresponding generally to the desired cross-section of the cable.

11 Claims, 8 Drawing Figures

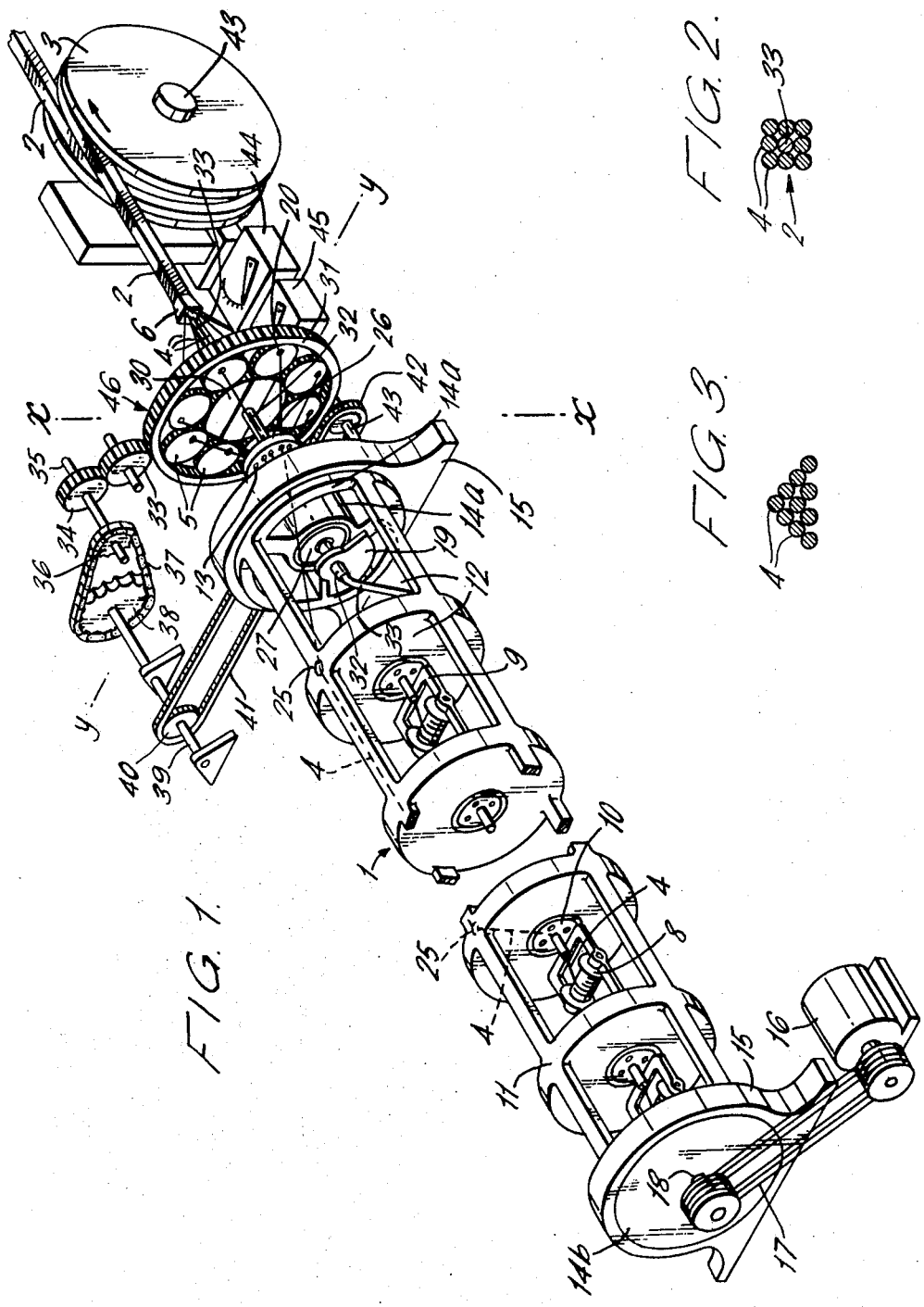

1

METHODS OF, AND APPARATUS FOR, THE MANUFACTURE OF STRANDED CABLES

BACKGROUND OF THE INVENTION

This invention relates to methods of, and apparatus for, the manufacture of stranded cables.

The invention provides a method of, and apparatus for, the manufacture of stranded cables having a cross-section other than circular. One application for such cables is in the construction of superconducting magnets.

SUMMARY OF THE INVENTION

According to one aspect of the invention, a method of manufacturing stranded cables comprises drawing the strands through spaced-apart locations constrained to move around a predetermined non-circular path defining a shape corresponding generally to the desired cross-section of the cable, and subsequently gathering the strands together whilst maintaining a drawing force on the strands.

Each of the said locations may be considered as an off-centre point location $L$ on a moving disc of radius $r$, the discs being caused to be driven around and in contact with the inside of the periphery of a circle of radius $R$ so that the locations $L$ move with a substantially constant linear velocity. If $R/r = 2$, the locations $L$ move around an elliptical path. If $R/r = 3$, the locations $L$ move around a generally triangular path. if $R/r = 4$, the locations L move around a generally square-shaped path, and so on.

Alternatively, the locations may be considered as point locations $L$ on an endless chain caused to move so as to describe a shape corresponding generally to the desired cross-section of the cable.

According to another aspect of the invention, apparatus for manufacturing stranded cables comprises means for drawing the strands through spaced-apart guides constrained to move around a predetermined non circular path contained in a plane traversing the strands and defining a shape corresponding generally to the desired cross-section of the cable, die means provided with a die opening corresponding to said cross-section, whereby the strands pass through said die opening after passage through said guides, and means for moving said guides around said path.

Each guide may have a generally circular profile of radius $r$ and have an off-centre guide hole formed in it. The circular guides may then be constrained to be driven around and in contact with the periphery of a circular aperture of radius $R$ formed in a guide-locating structure. If $R/r = 2$, the guide holes move around an elliptical path. If $R/r = 3$, the guide holes move around a generally triangular path. If $R/r = 4$, the guide holes move around a generally squareshaped path, and so on.

Alternatively, each guide may be attached to or forms part of and is thus carried by an endless belt or chain which describes a shape corresponding generally to the desired cross-section of the cable and means are provided for rotating said belt or chain.

The invention also comprises a cable manufactured by the aforesaid method.

BRIEF DESCRIPTION OF THE DRAWINGS

Examples and embodiments of the invention will now be described by way of example with reference to the accompanying drawings, wherein:

FIG. 1 is a view in perspective of cable manufacturing apparatus,

FIGS. 2 to 5 are cross-sections of cable manufactured according to the invention, and FIGS. 6 to 8 are views in perspective of other cable manufacturing apparatus.

In the figures, like reference numerals refer to like components.

DESCRIPTION OF THE PREFERRED EMBODIMENTS

Figures 4, 5, 6:
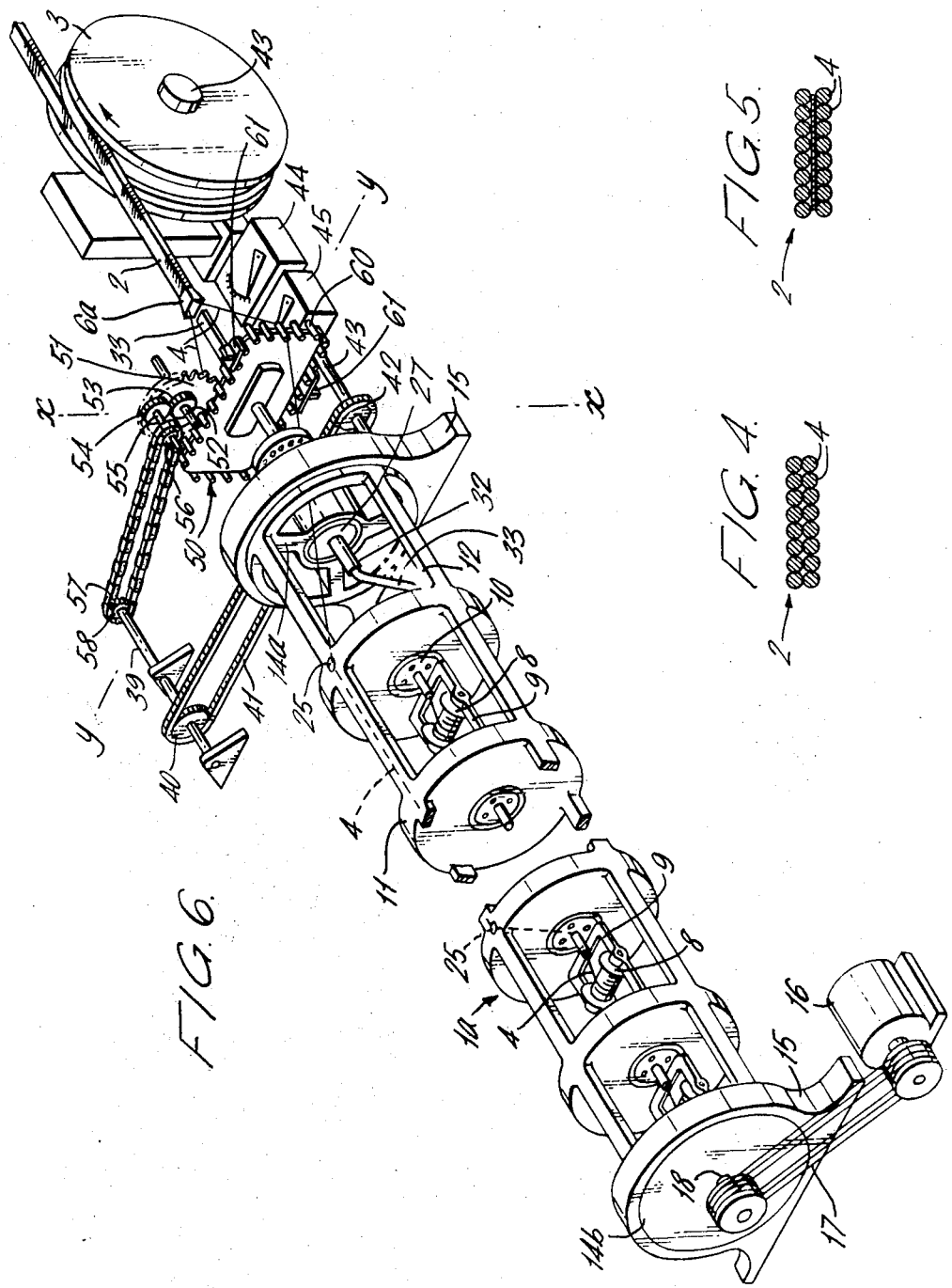

With reference first to FIG. 1, apparatus 1 for manufacturing a square-sectioned eight stranded cable 2 comprises a haul-off capstan 3 for drawing eight strands 4 of conductor wire through spaced-apart guides 5 constrained to move (as explained hereinafter) around a predetermined (square) path contained in a plane $x, y$ traversing the strands 4 and defining a (square) shape corresponding generally to the desired square-shaped cross-section of the cable 2, a stationary die 6 provided with a die opening having shape and dimensions corresponding to the said cross-section, the strands passing through said die opening after passage through the guides 5 and means indicated generally by reference numeral 46 for moving the guides around said path.

In further detail, the strands 4 are drawn-off bobbins 8. The bobbins 8 are provided with spring means (not shown) for applying active back tension to the strands and the bobbins are rotatably mounted on yokes 9 swivel-mounted in bearing assemblies 10 carried by a tubular casing 11 of a conventional tubular strander with access apertures 12. The casing 11 is rotatable and the swivel-mounted yokes 9 allow the bobbins 8 to remain stationary relative to the casing 11 so that strands 4 do not twist as they come off the bobbins and extend through the casing 11. The bearing assemblies 10 are apertured to allow axial passage of a strand 4 through each of their centres. Commencing from the end of the casing 11 remote from the guides 5, a single strand 4 extends axially through the bearing assembly 10 at that end and then diverges with a radial component of direction to pass over a fairlead 25 mounted on the wall of the casing 11. The strand 4 then passes axially along the casing 11 and adjacent the wall thereof, being located by further fairleads 25, to pass through one of three equispaced apertures in a "spider"-like end plate 14a of the tubular casing 11. The remaining seven strands 4 extend through the casing 11 in a similar manner.

The eight strands 4 emerging from the end plate 14a of the casing 11 pass through an equi-spaced eight of a number of equi-spaced guides holes 13 in a stranding plate 26 attached to the end plate 14a. They are then gathered together, whilst maintaining the drawing force applied by the capstan 3, by the die 6.

The ends of the tubular casing 11 are rotatably supported by bearings 15. The casing 11 is rotated by the electric motor 16 through belts 17 engaging pulleys 18 carried by the end plate 14b adjacent the motor 16.

The guides 5 have circular, toothed, profiles and have off-centre guide holes 20 formed in them. The guides 5 are disposed between and engage with the external teeth of a central sprocket or gear wheel 30 and the internal teeth of a sprocket or gear ring 31 disposed co-axial with the sprocket 30, and in the plane $x, y$. The ring 31 thus serves as a locating structure for the guides 5. A hollow shaft 32 connected to the sprocket 30 is located by a bearing 27 in the adjacent end plate 14a of the casing 11 and is constrained against rotation by a stabilising mass 19 disposed within the casing 11. Thus the sprocket 30 does not rotate. The sprocket ring 31 is rotatable and, as it rotates, it causes the guides 5 to move around the central, stationary sprocket 30. the radius of the mass 19 is not large enough to restrict passage of strands through the opening of the end plate 14a disposed behind the mass.

The radius R of the inner periphery of the ring 31 is four times the radius r of each guide 5. Thus R/r = 4. Thus the spaced-apart locations (guide holes 20) are constrained to move with a substantially constant peripheral velocity around a generally square path in the plane $x, y$. A filler strand 33 extends from a bobbin (not shown, but within the casing 11) and is threaded through the bore of the hollow shaft 32 to emerge from behind the sprocket 30 and enter the central portion of the die 6. The eight conductor strands 4 converge from the holes 20 in the guides 5 with a degree of twist to enclose the filler strand 33 as the strands 4, 33 enter the throat of the die 6. The combined strands 4, 33 emerge from the die 6 as the square-section cable 2, (see also FIG. 2), which cable 2 is wound on to the capstan 3.

The external teeth of the sprocket ring 31 engage with the teeth of a gearwheel 33, which teeth engage in turn with the teeth of a gearwheel 34. The gearwheel 34 is mounted on a shaft 35 which also carries a sprocket 36. An endless chain 37 connects the sprocket 36 with a sprocket 38 of larger diameter and which is mounted on a shaft 39. The shaft 39 also carries a pulley 40 which is connected, by way of a belt 41, to a pulley 42 mounted on a shaft 43. The shaft 43 is coupled to and is driven by the casing 11 by way of a gear train (not shown) contained in the adjacent bearing 15. Thus the sprocket ring 31 is driven by rotation of the casing 11. The drive arrangement is such that the ring 31 is driven at the same speed and in the same direction as the casing 11.

The capstan 3 is also driven by the shaft 43 but the speed of the capstan can be regulated by a gearbox 44. A direction-reversing gearbox 45 is also provided so that the direction of rotation of the capstan 3 can be changed if desired.

In the apparatus 1a of FIG. 6, the cable 2 manufactured thereby is of oblong cross-section. The strand guide means include an endless chain 50 which is disposed in the transverse plane $x, y$. The chain 50 is driven by a sprocket wheel 51, the teeth of which engage with the links of the chain.

The sprocket wheel 51 is mounted on a shaft 52 which also carries a gearwheel 53 the teeth of which engage with a gearwheel 54. The gearwheel 54 is mounted on a shaft 55 which also carries a sprocket 56 and this sprocket is driven by an endless chain 57 rotated by a sprocket 58 mounted on the shaft 39. Thus the chain 50 is driven by the shaft 43.

The chain 50 moves along the periphery of an oblong-shaped guide plate 59 attached to the shaft 32 so that the chain describes an oblong during its constrained movement. The throat of the die 6a is also oblong-shaped in lateral cross-section. The shaft 32 and guide plate 59 are prevented from rotation by constraints 61 which bear lightly against the chain 50. Each rotation of the casing 11 is matched by a full "rotation" of the chain 50.

The chain 50 has a plurality of equi-spaced guides 60 of tubular form through which 16 of the strands are threaded in substantially equi-spaced relationship.

In this arrangement the casing 11 carries seventeen bobbins 8 and the filler strand 33 is carried by a similar bobbin (not shown) adjacent the end plate 14a.

Replacement of the oblong-shaped guide plate 59 and oblong-throated die 6a by components of triangular shape will result in a cable 2 of triangular cross-section. Similarly, use of a square-shaped guide plate and square-throated die will result in a cable of square cross-section. However, these changes need to be accompanied by changes to the drives and lengths of chain 50 whereby each rotation of the casing 11 is matched by a full "rotation" of the chain 50.

FIG. 3 illustrates a cable 2 of triangular cross-section and FIGS. 4 and 5 cables of oblong cross-section. The cables 2 of FIGS. 3 and 5 do not incorporate filler strands 33, as it is not essential always to have a filler strand. It should be noted however that whatever shape is selected, the strands 4 should be threaded through the guides 60 in substantially equi-spaced relationship.

Figure 7:
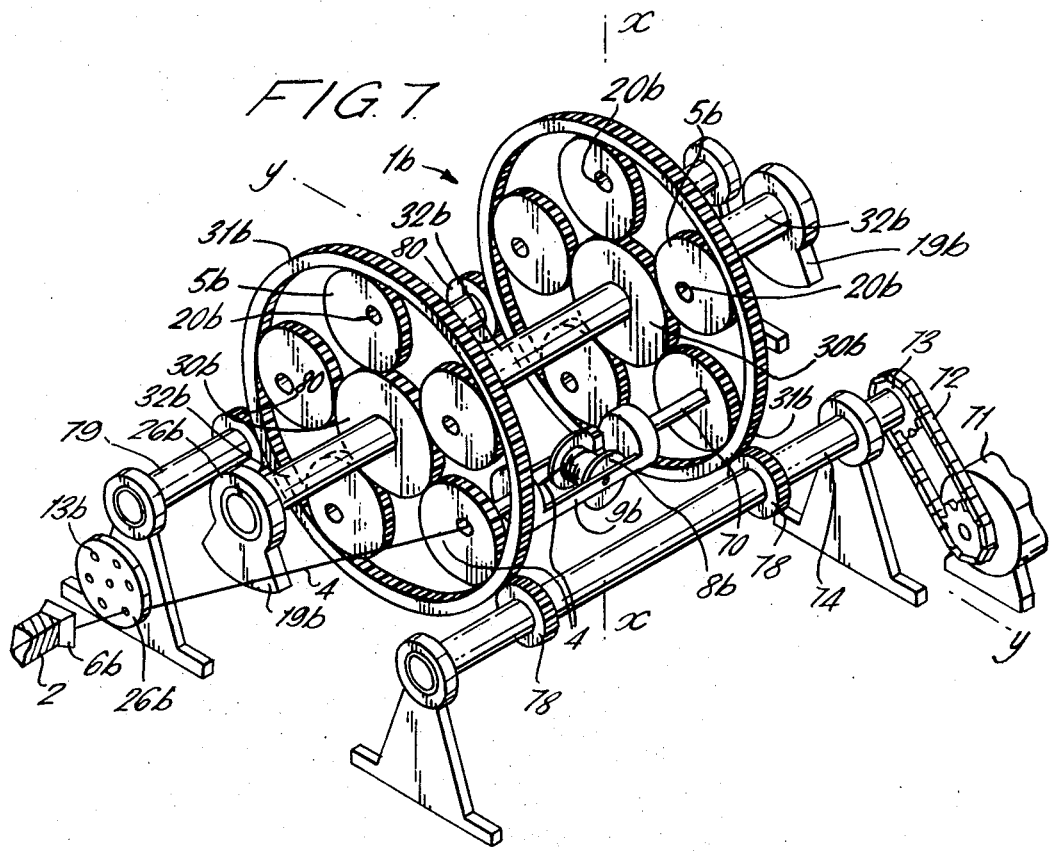

FIG. 7 illustrates planetary stranding apparatus 1b. Here two groups of guides 5b are disposed in tandem on a common (stationary) shaft 32b. The shaft 32b is prevented from rotating by a stabilising mass 19b at each of its ends. Yokes 9b are disposed between oppositely facing pairs of guides 5b and are rotatably located by the guide holes 20b thereof so that they remain substantially horizontal as the guides 5b move around the central sprockets 30b when the two sprocket rings 31b are rotated simultaneously.

The yokes 9b have tubular extensions 70 which are located by the guide holes 20b and a (back-tensioned) strand 4 comes off a bobbin 8b to pass through one of the extensions 70 before passage first through a guide hole 13b in a stationary strand plate 26b, and then through the throat of a stationary die 6b. The sprocket rings 31b are driven by an electric motor 71 through a belt 72 engaging with a pulley 73 mounted on one end of a shaft 74 carrying a pair of gearwheels 78 which engage with the rings 31b. A lay-shaft 79 carrying a pair of gearwheels 80 also engaging with the rings 31b is provided to support and locate the rings.

If a filler strand is to be used it can be passed through the bore of the hollow shaft 32b.

Figure 8:
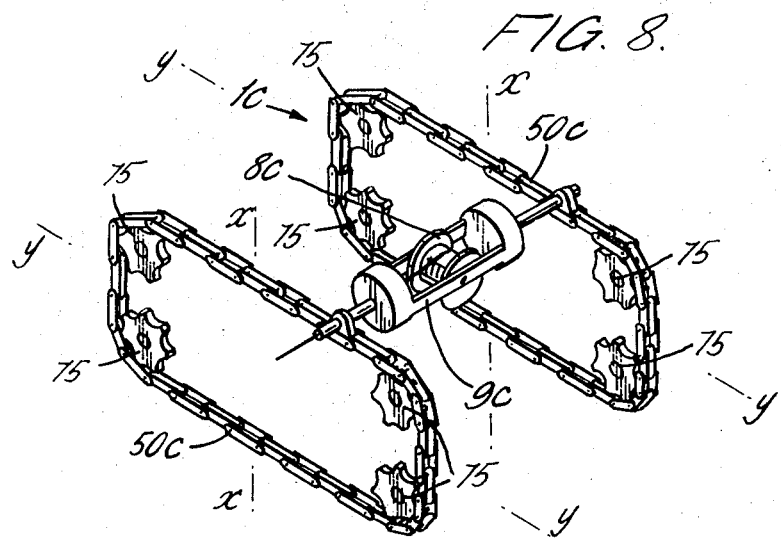

FIG. 8 illustrates apparatus 1c similar to apparatus 1b of FIG. 7, but incorporating a pair of endless chains 50c disposed in tandem mounted on a plurality of sprocket wheels 75, so as to move in substantially parallel planes.

The number of strands that can be employed in the manufacture of cable 2, using the apparatus of FIG. 1 (as illustrated) is, unfortunately, limited. For example, should it be desired to manufacture a square-section cable 2, the number of guide members 5 that can be used is limited to nine. (A similar restriction applies to the apparatus of FIG. 7).

The number of strands used can be increased however by disposing further guide members 5 between the external periphery of the sprocket ring 31 and a second sprocket ring of similar form to the ring 31. The second ring is then rotated in the same direction as the ring 31 but at a higher speed, which speed depends on the diameter of the second ring.

Instead of the co-axial sprocket rings, radially disposed rods can be used, the outer extremities of which carry guide eyes. The inner extremities of the rods ae rotatably mounted on and extend from the shaft 32 and the rods are pivotally attached to the guide members 5 intermediate their lengths.

The arrangement can be extended by "stacking" the further sets of guide members 5 etc. with their radially disposed rods in tandem with the rods "staggered" angularly so as to avoid fouling of the strands.

Known forms of tubular and planatory stranding machines may be suitable for conversion into apparatus according to the invention.

I claim:

1. A method of manufacturing stranded cable having a non-circular cross-section, comprising drawing separate strands through a plurality of spaced-apart location means whilst said means are each constrained to move around a predetermined non-circular path transverse to the general line of drawing and defining a shape corresponding generally to the desired non-circular cross-section of the cable, and subsequently gathering the strands together in a die means having an opening corresponding in shape with the non-circular cross-section of the cable whilst a drawing force is maintained on the strands.

2. The method of claim 1 wherein, after passage through said location means, the strands are caused to pass first through a stranding plate and then through the die.

3. The method of claim 1, wherein each of the location means comprises, in effect, an off-centre point location on a disc caused to be driven around and in contact with the inside of a circle so that the point locations move with a substantially constant linear velocity.

4. The method of claim 1, wherein each of the locations means comprises, in effect, a point location on an endless chain caused to move to describe a shape corresponding generally to the desired cross-section of the cable.

5. Apparatus for manufacturing stranded cable having a non-circular cross-section, comprising means for drawing separate strands through a plurality of spaced-apart guides, means constraining said guides to move around a predetermined non-circular path transverse to the general line of drawing and defining a shape corresponding generally to the desired non-circular cross-section of the cable, die means provided with a die opening corresponding to said non-circular cross-section of the cable and located and arranged such that the strands pass through said opening after passage through said guides, and means for moving said guides around said path.

6. Apparatus as claimed in claim 5, wherein each guide has a generally circular profile and defines an off-centre strand guide hole, and means are provided for driving the guides around and in contact with the periphery of a circular aperture formed in a guide-locating structure.

7. Apparatus as claimed in claim 6, wherein the guide-locating structure is rotatable and the guides are disposed between the periphery of the circular aperture of said structure and the periphery of a stationary guide-support structure of generally circular profile.

8. Apparatus as claimed in claim 5, wherein each guide is carried by an endless structure which is caused to move so as to describe a shape generally to the desired cross-section of the cable.

9. Apparatus as claimed in claim 8, wherein the endless structure comprises an endless chain.

10. Apparatus as claimed in claim 7, wherein the guide-locating structure and the guides it locates are duplicated, said structures being disposed in tandem so as to be rotatable about a common axis.

11. Apparatus as claimed in claim 8, wherein the endless structure is duplicated, the two structures being disposed in tandem so that they move in substantially parallel planes.

* * * * *